United States Patent
Pratap et al.

(10) Patent No.: US 10,311,738 B2
(45) Date of Patent: Jun. 4, 2019

(54) DISPLAY SYSTEM AND METHOD FOR INDICATING A TIME-BASED REQUIREMENT

(71) Applicant: HONEYWELL INTERNATIONAL INC., Morris Plains, NJ (US)

(72) Inventors: Sachin Pratap, Karnataka (IN); Jagadeesh Shankar, Karnataka (IN); Visvanathan Thanigai Nathan, Karnataka (IN); Mohammed Ibrahim Mohideen, Karnataka (IN); Shobana Arumugam, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 103 days.

(21) Appl. No.: 15/588,944

(22) Filed: May 8, 2017

(65) Prior Publication Data
US 2018/0322792 A1 Nov. 8, 2018

(51) Int. Cl.
*G08G 5/00* (2006.01)
*B64D 43/00* (2006.01)
*G06F 3/0484* (2013.01)

(52) U.S. Cl.
CPC ............ *G08G 5/0021* (2013.01); *B64D 43/00* (2013.01); *G06F 3/04845* (2013.01);
(Continued)

(58) Field of Classification Search
None
See application file for complete search history.

(56) References Cited

U.S. PATENT DOCUMENTS 6,308,044 B1 10/2001 Wright et al.
7,797,102 B2 9/2010 Fortier
(Continued)

FOREIGN PATENT DOCUMENTS

EP 2837914 A1 2/2015
EP 2955484 A1 12/2015

OTHER PUBLICATIONS

Extended EP Search Report for Application No. 18170685.4 dated Oct. 2, 2018.

*Primary Examiner* — Rami Khatib
(74) *Attorney, Agent, or Firm* — Lorenz & Kopf, LLP

(57) ABSTRACT

A display system is configured to provide a display to an aircraft flight crew. The system includes an image display device, a data storage device, a flight management system, a processing unit in operable electronic communication with the image display device, the data storage device, and the flight management system. The processing unit includes a computer processor that is configured to receive a time-based requirement to a point of interest associated with operation of the aircraft. Via the image display device, a flight display includes a graphically depicted time tape. The time tape includes a time scale. Also graphically depicted within the time tape is the point of interest using a first symbology and the time-based requirement using a second symbology. Operational parameter data of the aircraft allows determination of the ability of the aircraft to achieve the time-based requirement and graphical depiction within the time tape of the ability of the aircraft to achieve the time-based requirement using a third symbology.

18 Claims, 3 Drawing Sheets

(52) U.S. Cl.
CPC ....... *G06F 3/04847* (2013.01); *G08G 5/0013* (2013.01); *G08G 5/0047* (2013.01); *G08G 5/0052* (2013.01); *G08G 5/0078* (2013.01); *G08G 5/0091* (2013.01)

(56) References Cited

U.S. PATENT DOCUMENTS

| | | |
|---|---|---|
| 8,099,201 B1 | 1/2012 | Barber et al. |
| 8,396,614 B1 | 3/2013 | Pschierer |
| 8,756,012 B2 | 6/2014 | He et al. |
| 9,266,621 B2 | 2/2016 | Polansky et al. |
| 9,335,917 B2 | 5/2016 | Dostal et al. |
| 2010/0030467 A1 | 2/2010 | Wise et al. |
| 2010/0114406 A1 | 5/2010 | DeJonge et al. |
| 2015/0120177 A1 | 4/2015 | Palanisamy et al. |
| 2015/0204685 A1* | 7/2015 | Gearhart ................ G01C 21/36 701/533 |
| 2015/0332490 A1 | 11/2015 | Coulmeau et al. |
| 2016/0047674 A1 | 2/2016 | Ramaiah et al. |

* cited by examiner

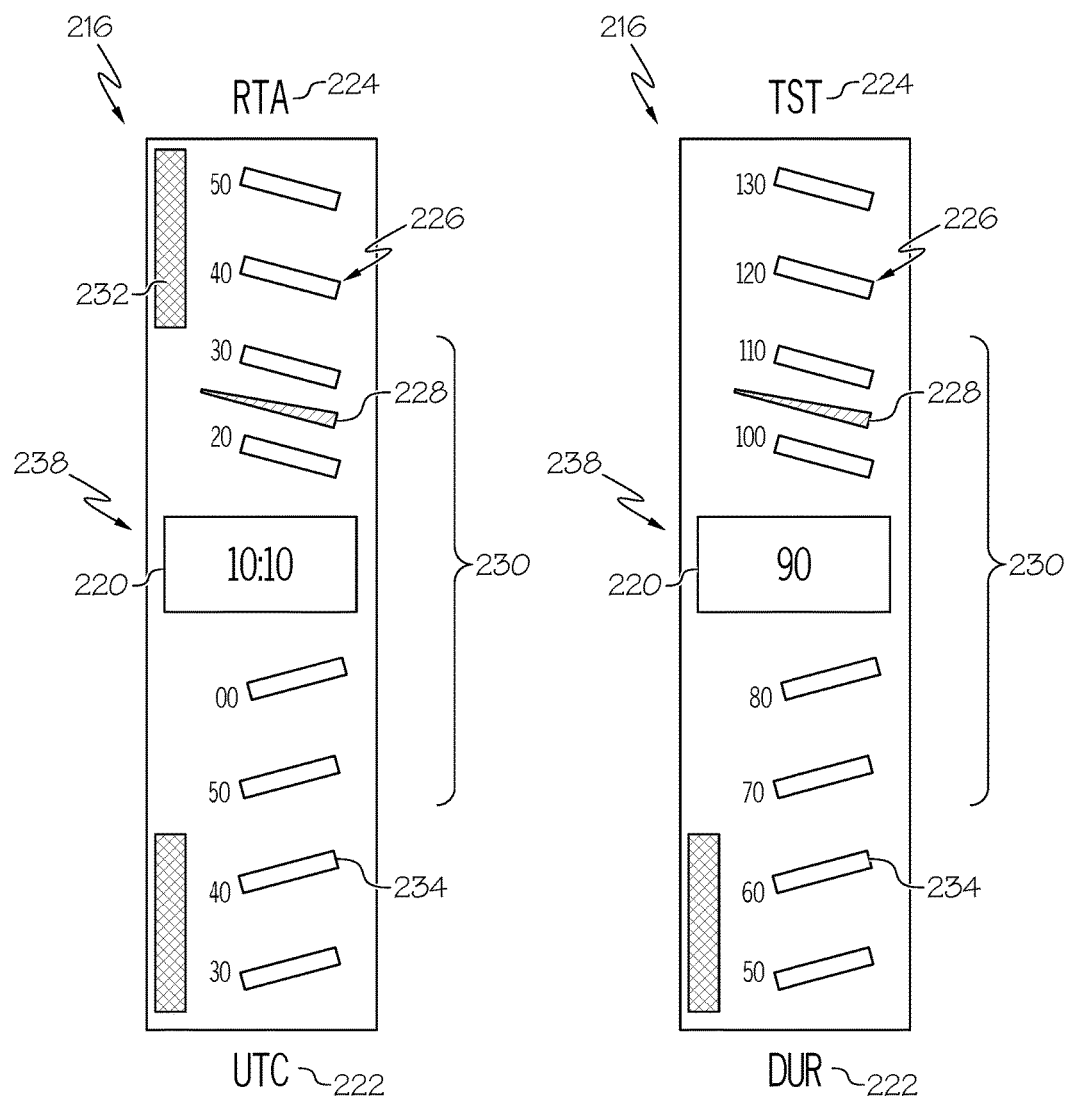

DISPLAY SYSTEM AND METHOD FOR INDICATING A TIME-BASED REQUIREMENT

TECHNICAL FIELD

The present disclosure generally relates to display systems, including aircraft display systems, and methods for providing displays. More particularly, the present disclosure relates to display systems and methods for providing displays indicating a time-based requirement.

BACKGROUND

The ever increasing amount of air traffic has caused a marked increase in the workload of flight crews and air traffic controllers in high traffic density areas around airports. The Next Generation (NextGen) overhaul of the United States airspace system and the companion Single European Sky ATM Research (SESAR) overhaul of the European airspace system create various trajectory-based mechanisms to improve air traffic management on those continents. Some solutions include the increased use of time-based requirements including time-based aircraft spacing and separation in high traffic density areas.

These new requirements are among the many time-based requirements placed upon a crew during a flight. In reality, every operation or maneuver of the aircraft depends on time. Some examples include:
1. A mutual required time of arrival (RTA) to be accepted between air traffic control (ATC) and the aircraft to economize the space and increase the flow of the aircraft flying into and out of airports.
2. On approach and landing using time-base separation (TBS) relative to the preceding aircraft to avoid wake turbulence of the preceding aircraft.
3. All aircraft that fly as formations regardless of mission need to meet at different points in air at a prescribed time, adhere to a schedule and report or arrive at certain points at a particular time.
4. An aircraft may be required to report to an air-to-air refueling rendezvous at a particular point in air at a particular time.
5. ATC commands an aircraft to report to or hold at a certain altitude for a certain time or duration
6. The aircraft may be required for a certain time to stay within a thrust climb rating for noise abatement.

These and many more such time-based requirements demand the crew monitor the time and manipulate flight and thrust controls to achieve a result at the stipulated time. Currently existing human interfaces do not provide sufficient situational awareness of the time element and leaves achieving a result to the analysis and assumptions of the crew. In certain cases if the aircraft reports earlier or later, the operation of other aircraft may be affected. Above all, the SESAR and the NextGen initiatives work towards the twin economic aspect of space and fuel optimization. Both these can only be achieved by saving time or by following and adhering strictly to a time element. Therefore there exists a need to provide a situational awareness of a time-based control to the crew to monitor the possibility of achieving a required activity in accordance with the time-based control.

BRIEF SUMMARY

Display systems and methods for providing displays are disclosed. In one exemplary embodiment, a display system is configured to provide a display to an aircraft flight crew. The system includes an image display device, a data storage device, a flight management system, and a processing unit in operable electronic communication with the image display device, the data storage device, and the flight management system. The processing unit includes a computer processor that is configured to receive a time-based requirement to a point of interest associated with operation of the aircraft. Via the image display device, a flight display includes a graphically depicted time tape. The time tape includes a time scale. Also graphically depicted within the time tape is the point of interest using a first symbology and the time-based requirement using a second symbology. Operational parameter data of the aircraft allows determination of the ability of the aircraft to achieve the time-based requirement, and graphical depiction within the time tape of the ability of the aircraft to achieve the time-based requirement using a third symbology.

A method for providing a display to a flight crew of an aircraft includes receiving a time-based requirement to a point of interest associated with operation of the aircraft and providing a flight display including a graphically depicted time tape having a time scale. Within the time tape, the method includes depicting the point of interest using a first symbology and graphically depicting within the time tape the time-based requirement using a second symbology. The method further includes receiving operational parameter data of the aircraft and determining an ability of the aircraft to achieve the time-based requirement based upon the operational parameter data. The method also includes graphically depicting within the time tape the ability of the aircraft to achieve the time-based requirement using a third symbology.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein:

FIG. 3 is a graphic illustration of a time tape indicator in accordance with the herein described embodiments; and FIG. 4 is a graphic illustration of a time tape indicator in accordance with another of the herein described embodiments.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The present disclosure generally provides systems and methods for displaying a time-based requirement as to the operation of an aircraft. The display provides to the pilot (or aircrew) an overview of impacts of the time-based requirement on aircraft operation, including without limitation, an indication of an ability to comply with the time-based requirement, ranges of time corresponding to permissible operation, and suggested modification of aircraft operation to achieve a time-based requirement. In a first mode of operation, the pilot is able to view the impact of the potential time-based requirement on aircraft operating parameters in order to determine whether the time-based requirement can be achieved. In a second mode of operation, the pilot is provided continuous information about the aircraft operation toward achieving the time-based requirement. The two modes relate to different needs of the pilot arising from the differences in the time-based requirements which results in different ways of presentation of the time-based requirement.

Figure 1:
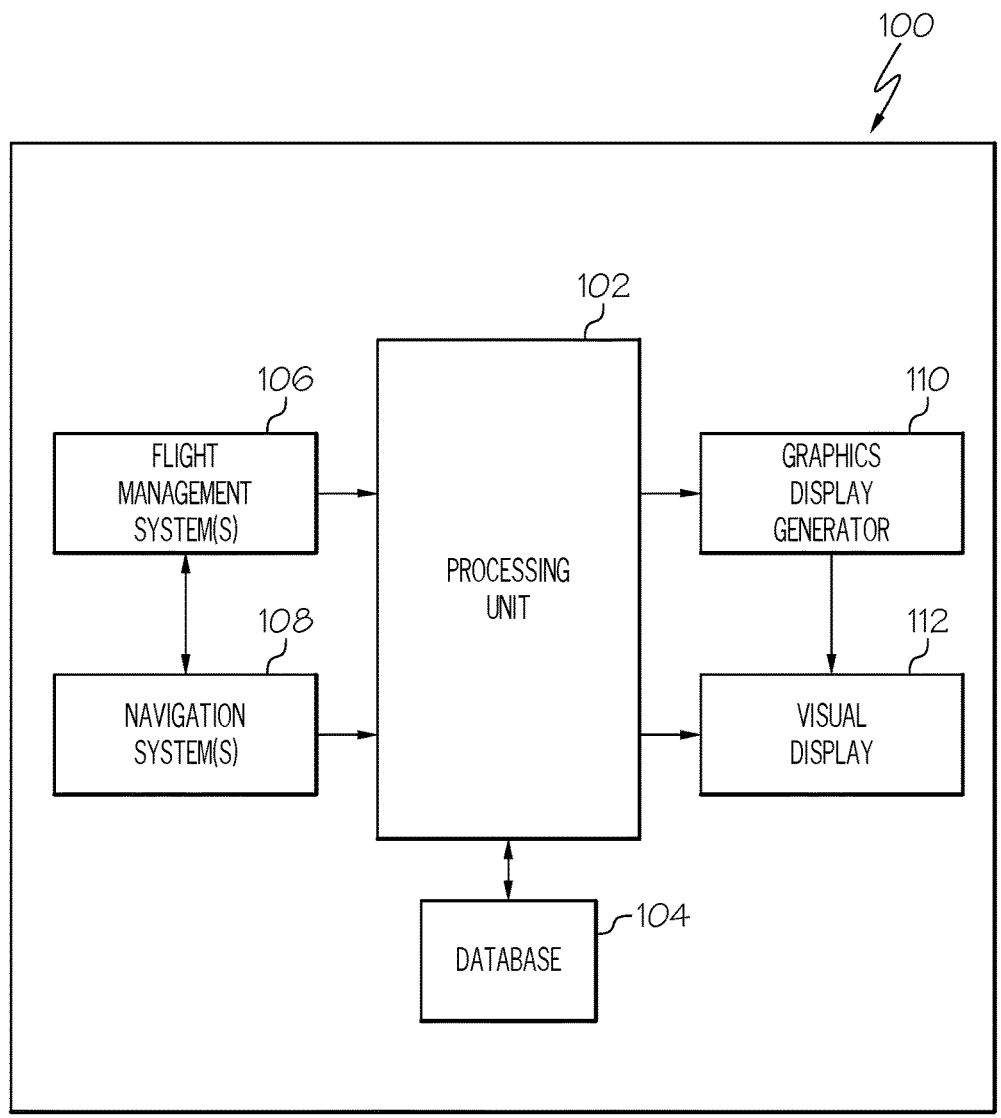
FIG. 1 is a block diagram of an exemplary flight display system in accordance with various embodiments of the present disclosure.

With reference now to the figures, FIG. 1 depicts a block diagram of an exemplary aircraft navigation and control system 100, which may be used to implement various embodiments of the present disclosure. In these embodiments, system 100 computes the movement of an aircraft in four dimensions (x, y, z, t). In a first mode, the system 100 depicts the aircraft's ability to achieve a time-based requirement, and in a second mode depicts the aircraft's progress in achieving a time-based requirement. In each mode, the system 100 provides the information to the pilot or flight crew in a highly intuitive manner. The display and method of operation of the display may vary depending on whether the system is operating in the first mode or the second mode to display the time-based requirement.

For this exemplary embodiment, system 100 includes a processing unit 102, a database 104, a flight management system 106, a navigation system 108, a graphics display generator 110, and a visual display 112. Notably, it should be understood that although system 100 appears in FIG. 1 to be arranged as an integrated system, the present disclosure is not intended to be so limited and may also include an arrangement whereby one or more of processing unit 102, database 104, flight management system 106, navigation system 108, graphics display generator 110, and visual display 112 is a separate component or a subcomponent of another system located either onboard or external to an aircraft. Also, for example, system 100 may be arranged as an integrated system (e.g., aircraft display system, Primary Flight Display system, etc.) or a subsystem of a more comprehensive aircraft system (e.g., flight management system, navigation and control system, target aiming and control system, collision alert and/or avoidance system, weather avoidance system, etc.). Furthermore, the present disclosure is not limited to aircraft displays, and system 100 may also be implemented for other types of vehicles' electronic displays (such as, for example, spacecraft navigation displays, ship navigation displays, submarine navigation displays, train navigation displays, motor vehicle navigation displays, etc.).

The processing unit 102 may be a computer processor such as, for example, a microprocessor, digital signal processor, or any suitable processor capable of at least receiving and/or retrieving aircraft flight management information (e.g., from flight management system 106), navigation and control information (e.g., from navigation system 108), terrain information, including waypoint data and coordinate data for airports, runways, natural and man-made obstacles, etc. (e.g., from database 104), generating display control signals for a visual display of the aircraft flight management information, the navigation and control information (including, for example, a zero pitch reference line, one or more heading indicators, tapes for airspeed and altitude, etc.), the terrain information, and sending the generated display control signals to a graphics display generator (e.g., graphics display generator 110) associated with an onboard visual display (e.g., visual display 112).

For example, processing unit 102 may be arranged as a single processor or plurality of processors connected to a data communications bus or system bus. A memory controller/cache may also be connected to the data communications bus or system bus, which may provide an interface between processing unit 102 and a local memory (e.g., RAM, ROM, etc.). A plurality of machine instructions may be stored in the local memory and retrieved and operated on by processing unit 102 to generate the control signals for the graphics display generator 110 and visual display 112. An Input/Output (I/O) bus bridge may also be connected to the data communications bus or system bus, which may provide an interface between processing unit 102 and an I/O bus. Thus, processing unit 102 may receive, retrieve and/or send data via such an I/O bus. In any event, those of ordinary skill in the art will appreciate that the hardware described herein for processing unit 102 in FIG. 1 may vary. As such, the depicted example is provided for illustrative purposes and not meant to imply any architectural limitations with respect to the present disclosure.

For this exemplary embodiment, system 100 also includes database 104 coupled to processing unit 102 (e.g., via an I/O bus connection). For example, database 104 may be a memory device (e.g., non-volatile memory, solid-state memory, electro-magnetic, optical or tape drive-type storage device, linked mass storage device, etc.) that may store digital target location data, terrain data and waypoint data (e.g., latitudinal and longitudinal data) as either absolute coordinate data or as a function of an aircraft's position. A source for the digital target location data, terrain data, and/or waypoint data stored in database 104 may be, for example electronically stored map data defining geographical features, locations and boundaries.

Database 104 may also include, for example, a terrain database, which may include the locations and elevations of natural terrain obstacles such as mountains or other elevated ground areas, and also the locations and elevations of man-made obstacles such as radio antenna towers, buildings, bridges, etc. A terrain database stored in database 104 may also include, for example, the boundaries of restricted airspace, restricted elevations for particular airspace, bodies of water, etc. As yet another example, a terrain database stored in database 104 may be a Jeppesen®-styled database, which may cover, for example, a 300 by 270 mile area of terrain and include topographical relief information. As still another example, airport and runway location data and terrain data stored in database 104 may be received from an onboard devices that sense and maps man-made obstacles (e.g., airports, runways, etc.) and variations in terrain, such as, for example, active or passive type of radar devices. As another example, airport and runway location data, and other types of high priority target data (e.g., locations of incoming traffic to avoid, constructed waypoints, obstacles in the aircraft's flight path, etc.) may be retrieved and/or received by processing unit 102 from a suitable source of such data, such as, for example, an onboard flight management system database (e.g., a component of flight management system 106), an onboard navigation database (e.g., a component of navigation system 108), an onboard sensor or radar devices, or an external database (e.g., via a data communication up-link).

System 100 may also include flight management system 106 and navigation system 108 coupled to processing unit 102 (e.g., via a respective I/O bus connection). Notably, flight management system 106 and navigation system 108 are depicted as separate components in the example embodiment of system 100. Alternatively, flight management system 106 and navigation system 108 and/or their functions of flight management, navigation and control may be combined in one system (e.g., in flight management system 106), or navigation system 108 may be a subsystem of flight management system 106. In any event, flight management system 106 and/or navigation system 108 may provide navigation data associated with the aircraft's current position and flight direction (e.g., heading, course, track, etc.) to processing unit 102. As such, navigation system 108 may include, for example, an inertial navigation system, a satellite navigation system (e.g., Global Positioning System) receiver, VLF/OMEGA, Loran C, VOR/DME, DME/DME, IRS, aircraft attitude sensors, or the navigation information may come from flight management system 106. The navigation data provided to processing unit 102 may also include information about the aircraft's airspeed, ground speed, altitude (e.g., relative to sea level), pitch, and other important flight information if such information is desired. In any event, for this example embodiment, flight management system 106 and/or navigation system 108 may include any suitable position and direction determination devices that are capable of providing processing unit 102 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.).

For this exemplary embodiment, system 100 also includes graphics display generator 110 coupled to processing unit 102 (e.g., via an I/O bus connection) and visual display 112. Visual display 112 may also be coupled to processing unit 102 (e.g., via an I/O bus connection). For example, visual display 112 may include any device or apparatus suitable for displaying various types of computer-generated symbols and information, in an integrated, multi-color or monochrome form, representing one or more of pitch, heading, flight path, airspeed, altitude, targets, waypoints, terrain, flight path marker data, and notably, a graphical indication of the aircraft's progress in achieving a time-based requirement. Using aircraft position, direction (e.g., heading, course, track, etc.), speed data retrieved (or received) from flight management system 106 and/or navigation system 108, wind data (e.g., speed, direction) and terrain (e.g., waypoint) data retrieved (or received) from database 104, processing unit 102 executes one or more algorithms (e.g., implemented in software) for determining the current position of the host aircraft, its heading (course, track, etc.), and computing an ability to achieve the time-based requirement, such as, without limitation, an ETA for a predetermined location (e.g. waypoint) based on the aircraft's current speed. Processing unit 102 then generates a plurality of display control signals representing, among other things, a graphical indication showing the aircraft's progress in achieving the time-based requirement, and sends the plurality of display control signals to visual display 112 via graphics display generator 110. Preferably, for this embodiment, visual display 112 is an aircraft cockpit, multi-color display (e.g., a Primary Flight Display). Graphics display generator 110 interprets the received plurality of display control signals and generates suitable display symbols, which are presented on a screen or monitor of visual display 112.

Notably, although an existing cockpit display screen system may be used to display the above-described flight information symbols and data, the present disclosure is not intended to be so limited and may include any suitable type of display medium capable of visually presenting multicolored or monochrome flight information for a pilot or other flight crew member. As such, many known display monitors are suitable for displaying such flight information, such as, for example, various CRT and flat-panel display systems (e.g., CRT displays, LCDs, OLED displays, plasma displays, projection displays, HDDs, HUDs, etc.). For example, visual display 112 may be implemented as a heads-down Primary Flight Display or as a heads-up display (HUD).

Figure 2:
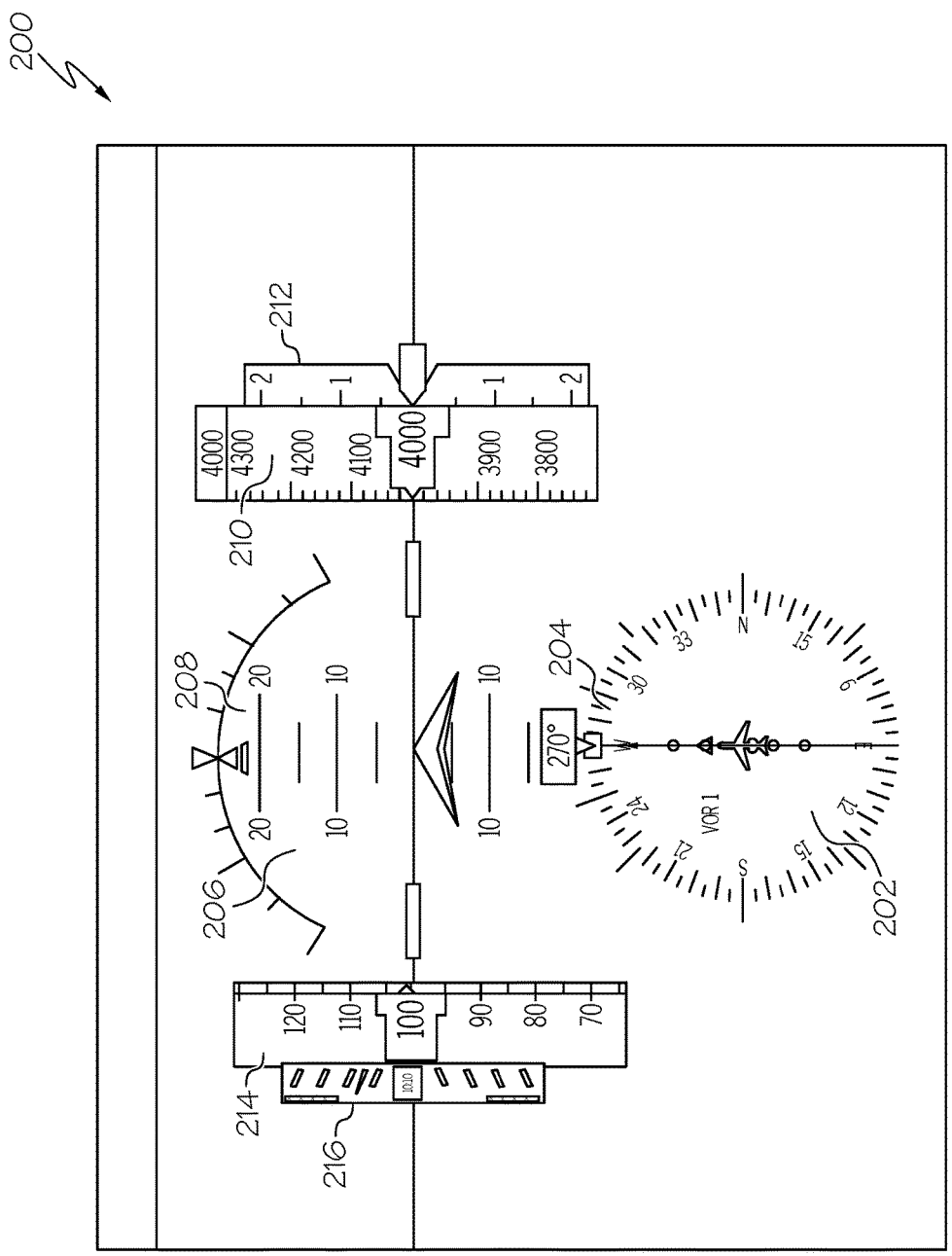
FIG. 2 is a graphic depiction of a flight display in accordance with the herein described exemplary embodiments.

FIG. 2 depicts an exemplary a flight display 200, such as without limitation, a Primary Flight Display (PFD). For example, while depicted in FIG. 2 as a PFD, the flight display 200 may be implemented as part of a navigation display (ND), a multi-function display (MFD) or a heads-up display (HUD). Among common elements of a flight display, the flight display 200 includes a horizontal situation indicator 202, a turn indicator 204, attitude indicator 206, slip/skid indicator 208, altimeter 210, vertical speed indicator 212 and an air speed indicator 214. At any suitable location within the flight display 200, there is depicted a time tape indicator 216. For the exemplary embodiment depicted in FIG. 2, the time tape indicator 216 is positioned adjacent to and to the left of the air speed indicator 214. It will be appreciated that the time tape indicator 216 may be located within the flight display 200 at any suitable location. While the position of the time tape indicator 216 may be fixed with the design of the flight display 200 to optimize the human machine interface and interaction, the time tape indicator 216 may be positionable by for example, user selection or preference, and/or it may be dynamically positioned, repositioned or omitted from the flight display 200 by action of the graphics display generator 110, for example when there is no pending time-based requirement. As will be appreciated by the skilled person, the time tape indicator 216 may be provided in newly deployed flight displays or may be retrofitted to existing flight displays via suitable update to various software elements, such as software drivers for the graphics display generator 110.

Referring to FIG. 3, the time tape indicator 216 may include in exemplary embodiments a numeric time indicator 220, a time type indicator 222, a point of interest indicator 224, a time scale 226, a time-requirement indicator 228, a time window indicator 230, and time limiting indicators 232. As an initial matter, a point of interest as used in connection with the herein described exemplary embodiments may be a time-based requirement such as a required time of arrival requirement (RTA), a waypoint requirement (WPT), a mission point requirement (MPT), an arrival point requirement (APT), a reporting point requirement (RPT), a fueling point in air (FPT), a reporting altitude requirement (ALT), and the like. As depicted in FIG. 3, the point of interest indicator 224 indicates the time-based requirement as a required time of arrival requirement (RTA). The numeric time indicator 220 provides a numeric indication of the time-based requirement. For the exemplary embodiment depicted in FIG. 3, the numeric time indicator 220 is caused to indicate the time-based requirement, in this case a required time of arrival arrival (RTA), as a numeric time value relative to a reference time, e.g., universal coordinated time (UTC), Greenwich mean time (GMT), local time at location, local time at destination and the like.

In addition to depicting to the pilot or flight crew the time-based requirement in terms of type, point of interest indicator 224, and time requirement, numeric time indicator 220, the time tape indicator 216 provides time-based situational awareness. The time-based requirement may be a requirement communicated by air-traffic control (ATC), a time-base requirement dictated by a mission requirement, or other such time-based requirement. The time-tape indicator provides the pilot or flight crew at a glance virtually complete time-based situational awareness.

With continued reference to FIG. 3, the numeric time indicator 220 displays the desired time to comply with the time-based requirement. The time window indicator 230 depicts a range of time within which performance is possible, based upon aircraft and/or operating conditions, or within which performance is acceptable to achieve the time-based requirement. The time limiting indicators 232 indicate unacceptable performance as color-coded bars adjacent the time scale 227. In exemplary embodiments, each of the time window indicator 230 and time limiting indicators are depicted relative to the time scale 226.

On the time scale 226, the time divisions, one of which is depicted as time division 234, above and below a center 238 of the time tape indicator 216 depicts the possible zone of time to the point of interest that assist in planning, negotiating or aborting a time-based requirement. For example, if the RTA requested by ATC is 10:10 hrs UTC time, as indicated in the example depicted in FIG. 3, and the aircraft is capable of achieving the RTA between 10:20 and 10:40 UTC, a first time limiting indicator 232 will raise up to 10:20 and a second time limiting indicator recede to 10:40, showing the possible RTA time zone. The time requirement indicator 228 provides an indication of possible aircraft operation which will satisfy the time-based requirement, while allowing for achieving another operational objection, such as optimizing operational economy. The time window indicator 230 and time limiting indicators 232 may further convey an acceptable time to remain at a point of interest or a time to maintain an operational condition, e.g., such as radio or radar silence.

Color coding and changing symbology, e.g., shapes, of various of the time tape indicator 216 further enhances pilot and flight crew situational awareness. In an exemplary embodiment, if under acceptable operating parameters, whether operational or managed limitations, the aircraft is able to comply with the time-based requirement, the time numeric time indicator 220 may indicate the time-based requirement in a green color. However, if the time-based requirement cannot be achieved, a possible time to which compliance is possible, may be indicated by the numeric time indicator in yellow. The pilot, flight crew or flight data communication system may report the inability to comply with the requested time-based requirement, and report and accept the alternative proposed new time, as a numeric value, which may then be displayed green within the numeric time indicator 220.

In certain cases the time tape indicator 216 provides an intuitive prompt to the pilot or flight crew to change aircraft operation, e.g., to accelerate or decelerate to achieve the proposed time. As depicted in FIG. 3, the time based requirement is a required time of arrival requirement (RTA). Compliance is indicated in the numeric time indicator 220 as a time, relative to UTC, which is indicated by the display of "UTC" by the time type indicator 222. The time-based requirement may be required separation to another aircraft such as may be required on approach and landing.

FIG. 4 depicts an exemplary embodiment of the time tape indicator 216 configured in time separation mode. The numeric time display 220 depicts the time separation requirement numerically and in a color, such as white. The time requirement indicator 228 depicts actual time separation as a symbol, such as an arrow and in a color such as green relative to the time scale 226. If the time requirement indicator 228 is within the time window indicator 230, it shows that under current operating conditions the aircraft can meet the time-based requirement. In the case that the time requirement indicator 228 is moving up the time scale 226 showing an increase in the time separation, the pilot is informed to accelerate to reduce the time of separation and vice-versa. That the time-based requirement is a Time Based Separation requirement (TBS), is indicated by a "DUR" or duration indication in the time type indicator 222. The concept of time separation allows for controlling aircraft operation to optimize wake vortex separation and dispersion allowing for reduced distance between landing aircraft under various conditions, such as high head winds that tend to disburse wake vortices. Consequently, airports may be able to operate with the same landing and capacity rates as in favorable weather conditions. The time of separation can be computed based on winds and placed in the numeric time indicator 220 of the time tape indicator 216. The pilot need only fly to keep the time requirement indicator 228 in the center of the time scale 226.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A display system configured to provide a display to a flight crew of an aircraft comprising:
   an image display device;
   a data storage device;
   a flight management system; and
   a processing unit in operable electronic communication with the image display device, the data storage device, and the flight management system, wherein the processing unit comprises a computer processor that is configured to:
   receive a time-based requirement to a point of interest associated with operation of the aircraft;
   provide via the image display device a flight display including a graphically depicted time tape, wherein the time tape comprises a time scale;
   graphically depict within the time tape the point of interest using a first symbology;
   graphically depict within the time tape the time-based requirement using a second symbology, different than the first symbology;

query the flight management system to obtain therefrom operational parameter data of the aircraft, determine an ability of the aircraft to achieve the time-based requirement based upon the operational parameter data; and in a first mode of operation to graphically depict within the time tape the ability of the aircraft to achieve the time-based requirement using a third symbology, different than the first symbology and second symbology; and in a second mode of operation to graphically depict within the time tape an indicator of progress of the aircraft to the time-based requirement using the third symbology, wherein the mode of operation is selected by the processing unit based upon the time-based requirement.

2. The display system of claim 1, wherein the first symbology is a first color and the second symbology is a second color that differs from the first color.

3. The display system of claim 2, wherein the first symbology is a first color and the third symbology is a third color that differs from the second color.

4. The display system of claim 1, wherein the first symbology is a first shape and the second symbology is a second shape that differs from the first shape.

5. The display system of claim 4, wherein the first symbology is a first shape and the third symbology is a third shape that differs from the second shape.

6. The display of claim 1, wherein one of the first symbology and the second symbology is an alpha-numeric symbol.

7. The display of claim 1, wherein one of the first symbology and the second symbology is an alpha-numeric symbol, and the third symbology is a shape.

8. The display system of claim 1, wherein one of the first symbology and the second symbology is an alpha-numeric symbol, and the third symbology is a color.

9. The display of claim 1, wherein the point of interest comprises a required time of arrival requirement (RTA), a waypoint requirement (WPT), a mission point requirement (MPT), an arrival point requirement (APT), a reporting point requirement (RPT), a fueling point in air (FPT) or a reporting altitude requirement (ALT).

10. A method for providing a display to a flight crew of an aircraft comprising:

receiving a time-based requirement to a point of interest associated with operation of the aircraft;

providing a flight display including a graphically depicted time tape, wherein the time tape comprises a time scale;

graphically depicting within the time tape the point of interest using a first symbology;

graphically depicting within the time tape the time-based requirement using a second symbology, different than the first symbology;

receiving operational parameter data of the aircraft;

determining an ability of the aircraft to achieve the time-based requirement based upon the operational parameter data; and in a first mode of operation graphically depicting within the time tape the ability of the aircraft to achieve the time-based requirement using a third symbology, different than the first symbology and second symbology; and in a second mode of operation to graphically depict within the time an indicator of progress of the aircraft to the time-based requirement using the third symbology, wherein the mode of operation is selected by the processing unit based upon the time-based requirement.

11. The method of claim 10, wherein the first symbology is a first color and the second symbology is a second color that differs from the first color.

12. The method of claim 11, wherein the first symbology is a first color and the third symbology is a third color that differs from the second color.

13. The method of claim 10, wherein the first symbology is a first shape and the second symbology is a second shape that differs from the first shape.

14. The method of claim 13, wherein the first symbology is a first shape and the third symbology is a third shape that differs from the second shape.

15. The method of claim 10, wherein one of the first symbology and the second symbology is an alpha-numeric symbol.

16. The method of claim 10, wherein one of the first symbology and the second symbology is an alpha-numeric symbol, and the third symbology is a shape.

17. The method of claim 10, wherein one of the first symbology and the second symbology is an alpha-numeric symbol, and the third symbology is a color.

18. The method of claim 10, wherein the point of interest comprises a required time of arrival requirement (RTA), a waypoint requirement (WPT), a mission point requirement (MPT), an arrival point requirement (APT), a reporting point requirement (RPT), a fueling point in air (FPT) or a reporting altitude requirement (ALT).

* * * * *